(12) United States Patent
Chen

(10) Patent No.: US 9,168,849 B2
(45) Date of Patent: Oct. 27, 2015

(54) CHILD CAR SAFETY SEAT

(71) Applicant: BP Children's Products HK Co., Limited, Kowloon (HK)

(72) Inventor: Ying-Zhong Chen, Kowloon (HK)

(73) Assignee: B.P. Children's Products HK Co. Limited, Kowloon (HK)

( * ) Notice: Subject to any disclaimer, the term of this patent is extended or adjusted under 35 U.S.C. 154(b) by 0 days.

(21) Appl. No.: 13/926,261

(22) Filed: Jun. 25, 2013

(65) Prior Publication Data

US 2014/0001804 A1  Jan. 2, 2014

(30) Foreign Application Priority Data

Jun. 27, 2012  (CN) .......................... 2012 1 0214640

(51) Int. Cl.
*B60N 2/28*  (2006.01)

(52) U.S. Cl.
CPC .............. *B60N 2/2821* (2013.01); *B60N 2/286* (2013.01); *B60N 2/2845* (2013.01)

(58) Field of Classification Search
CPC .... B60N 2/2821; B60N 2/2845; B60N 2/286; B62B 9/28
USPC .......................................... 297/256.16, 250.1
See application file for complete search history.

(56) References Cited

U.S. PATENT DOCUMENTS

| 5,058,283 | A | * | 10/1991 | Wise et al. ...................... 33/371 |
| 5,625,956 | A | * | 5/1997 | Cone et al. ...................... 33/370 |
| 6,183,044 | B1 | | 2/2001 | Koyanagi et al. |
| 6,299,249 | B1 | * | 10/2001 | Mori ........................ 297/256.13 |
| 6,322,142 | B1 | * | 11/2001 | Yoshida et al. ............. 297/250.1 |
| 6,793,280 | B2 | * | 9/2004 | Washizuka et al. ........... 297/130 |
| 6,811,216 | B2 | * | 11/2004 | Sedlack ..................... 297/250.1 |
| 6,863,286 | B2 | * | 3/2005 | Eros et al. .................. 280/47.38 |
| 7,207,628 | B2 | * | 4/2007 | Eros .............................. 297/297 |
| 7,466,221 | B1 | * | 12/2008 | Lehr .......................... 340/457.1 |
| 7,597,396 | B2 | * | 10/2009 | Longenecker et al. ....... 297/253 |
| 8,070,226 | B2 | * | 12/2011 | Dingler et al. ........... 297/256.11 |
| 2008/0303321 | A1 | | 12/2008 | Powell |

FOREIGN PATENT DOCUMENTS

CN  201077390 Y  6/2008
EP  2210769 A2  7/2010

* cited by examiner

*Primary Examiner* — David R Dunn
*Assistant Examiner* — Tania Abraham
(74) *Attorney, Agent, or Firm* — Krieg DeVault LLP

(57) ABSTRACT

A child car safety seat includes: a base having a shell body that defines an inner space therein and that is formed with a viewing window for permitting a user to view therethrough into the inner space; a seat body detachably mountable on and engageable with the base; and an indicator disposed in the inner space in the shell body and having an indication. The indicator is operatively associated with the base and the seat body such that the indication is disposed at the viewing window upon engagement between the seat body and the base so as to permit the user to see the indication through the viewing window and is not disposed at the viewing window upon disengagement between the seat body and the base.

20 Claims, 19 Drawing Sheets

US 9,168,849 B2

CHILD CAR SAFETY SEAT

CROSS-REFERENCE TO RELATED APPLICATION

This application claims priority of Chinese Application No. 201210214640.3, filed on Jun. 27, 2012.

BACKGROUND OF THE INVENTION

1. Field of the Invention

This invention relates to a child car safety seat, more particularly to a child car safety seat having a viewing window and an indication that is operable to be seen through the viewing window for indicating a connection state between a base and a seat body.

2. Description of the Related Art

A conventional child car safety seat normally includes a base that is adapted to be secured to a car seat in a vehicle and that is provided with at least one first engaging member, and a seat body that is mountable on the base and that is provided with at least one second engaging member. The seat body can be secured to the base through engagement between the first and second engaging members. However, the conventional child car safety seat is disadvantageous in that whether the engagement between the first and second engaging members is completed or not is determined by the user's intuition or experience, which increases the risk of mistakes.

SUMMARY OF THE INVENTION

Therefore, an object of the present invention is to provide a child car safety seat that can overcome the aforesaid drawback associated with the prior art.

According to this invention, there is provided a child car safety seat that comprises: a base having a shell body that defines an inner space therein and that is formed with a viewing window for permitting a user to view therethrough into the inner space; a seat body detachably mountable on and engageable with the base; and an indicator disposed in the inner space in the shell body and having an indication. The indicator is operatively associated with the base and the seat body such that the indication is disposed at the viewing window upon engagement between the seat body and the base so as to permit the user to see the indication through the viewing window and is not disposed at the viewing window upon disengagement between the seat body and the base so that the indication cannot be seen by the user through the viewing window.

BRIEF DESCRIPTION OF THE DRAWINGS

In drawings which illustrate an embodiment of the invention.

DETAILED DESCRIPTION OF THE PREFERRED EMBODIMENT

Figure 1:
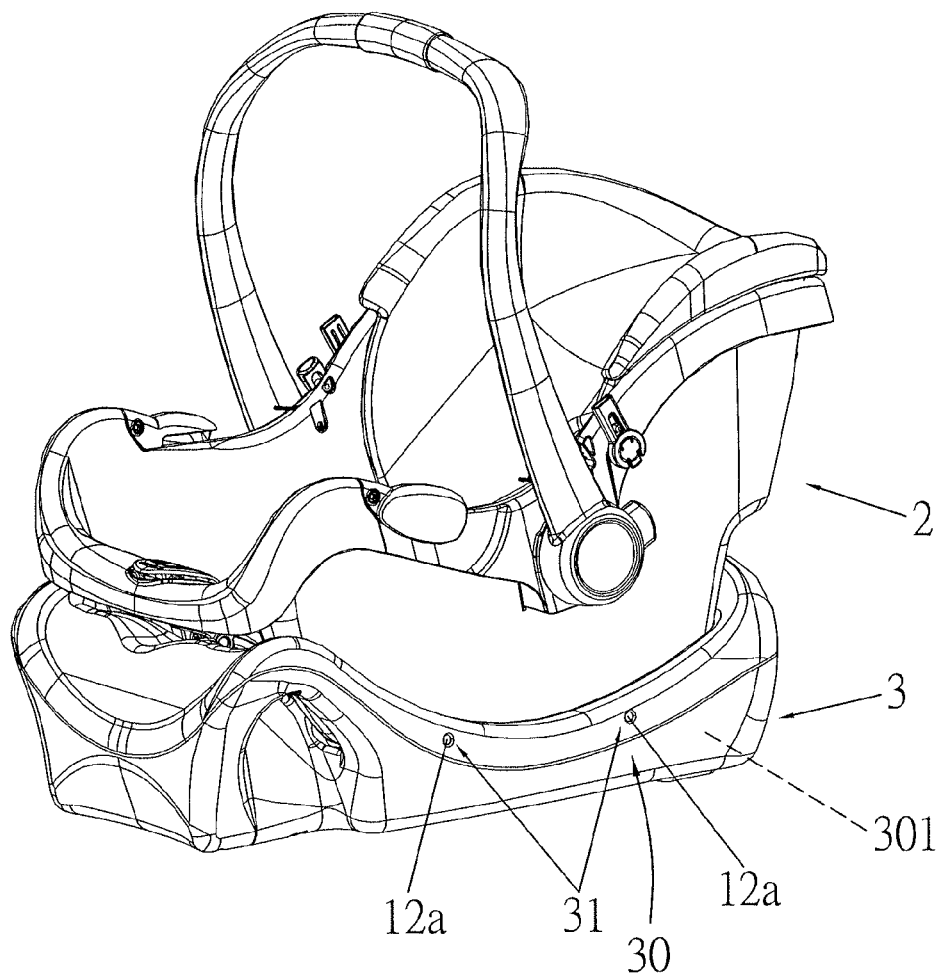
FIG. 1 is a perspective view of the preferred embodiment of a child car safety seat according to the present invention.
Figure 2:
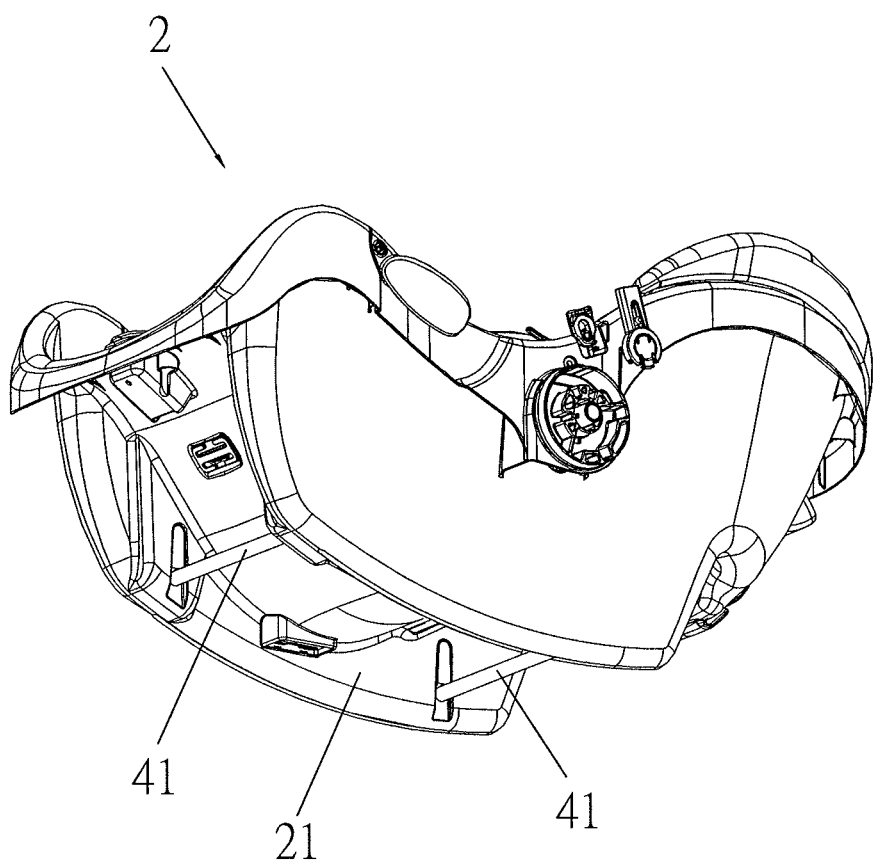
FIG. 2 is a bottom perspective view of a seat body of the preferred embodiment.
Figure 3:
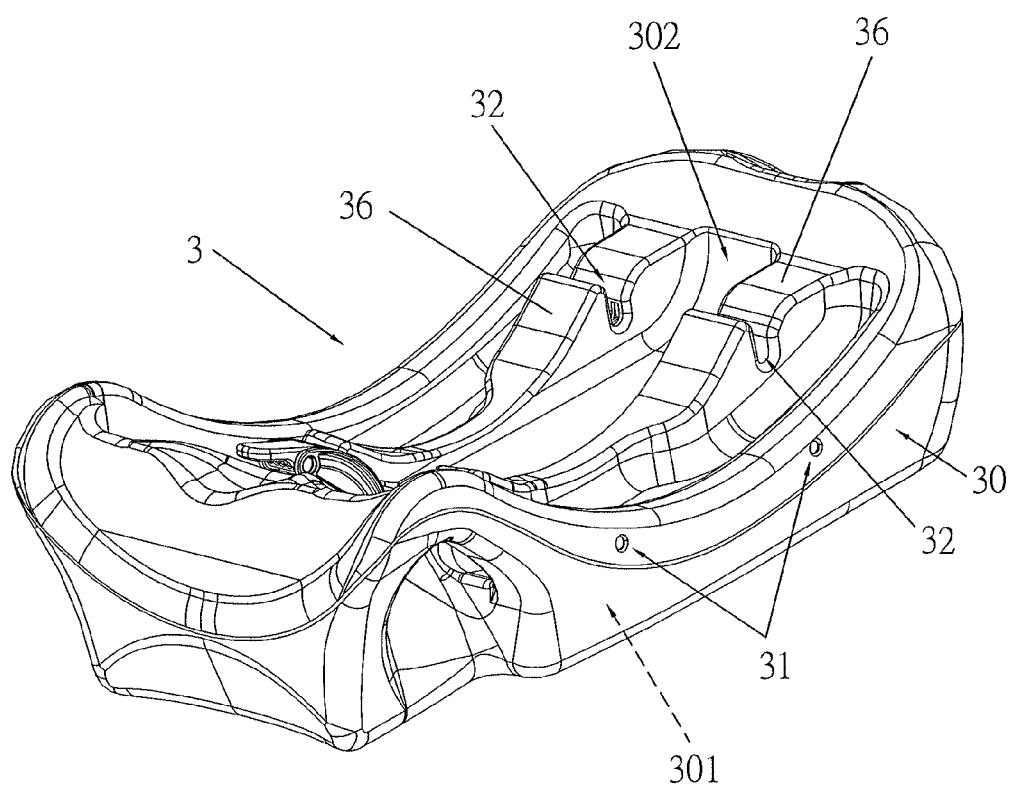
FIG. 3 is a top perspective view of a base of the preferred embodiment.
Figure 4:
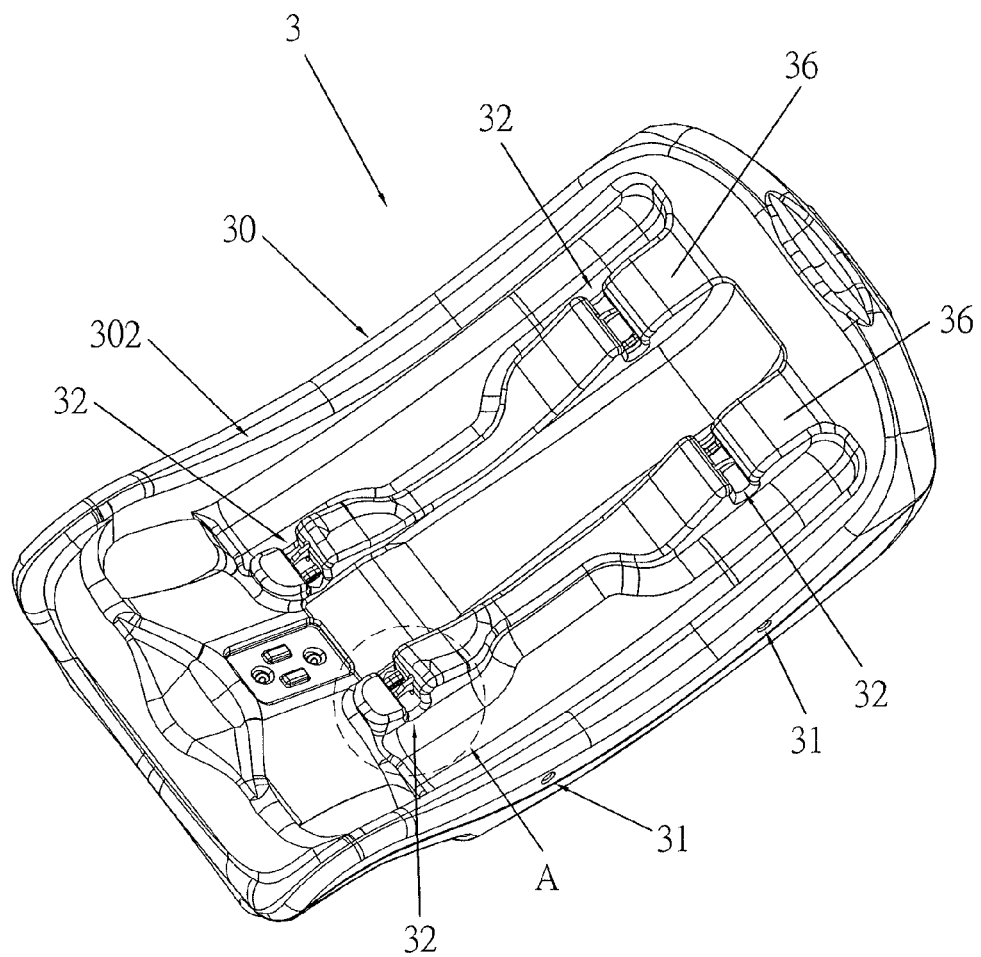
FIG. 4 is another top perspective view of the base of the preferred embodiment.
Figure 5:
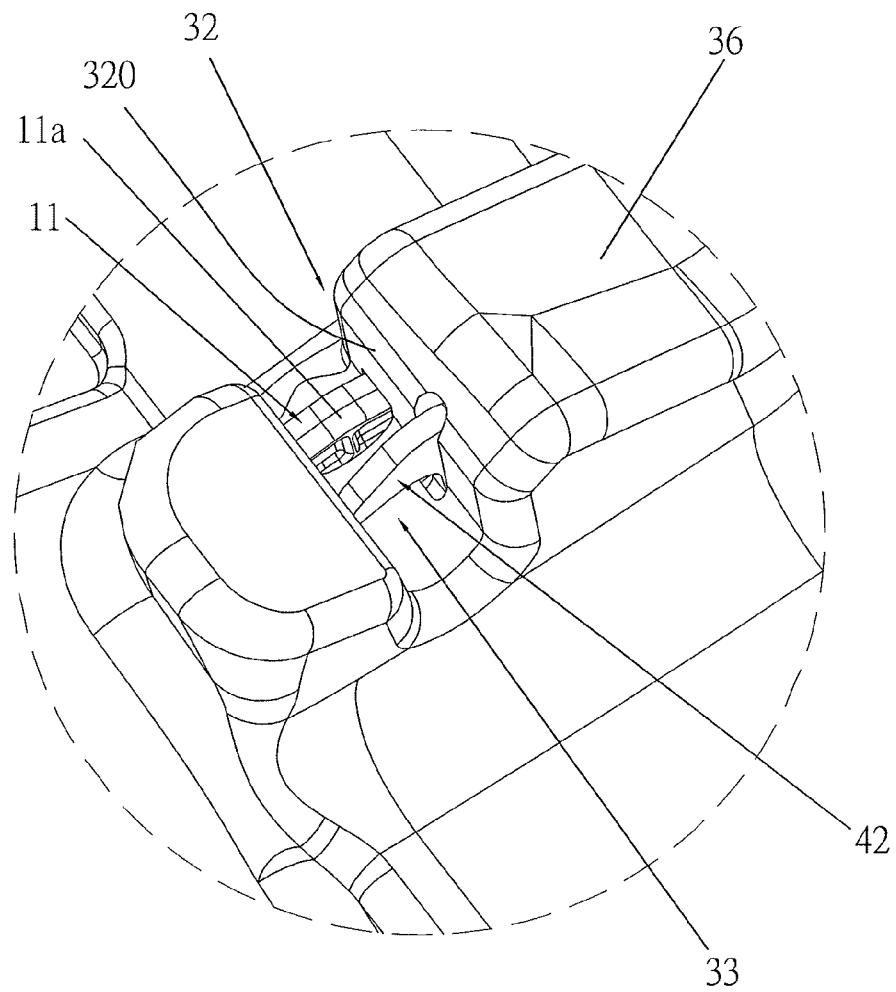
FIG. 5 is an enlarged perspective view of an area within a circle (A) of FIG. 4.
Figure 6:
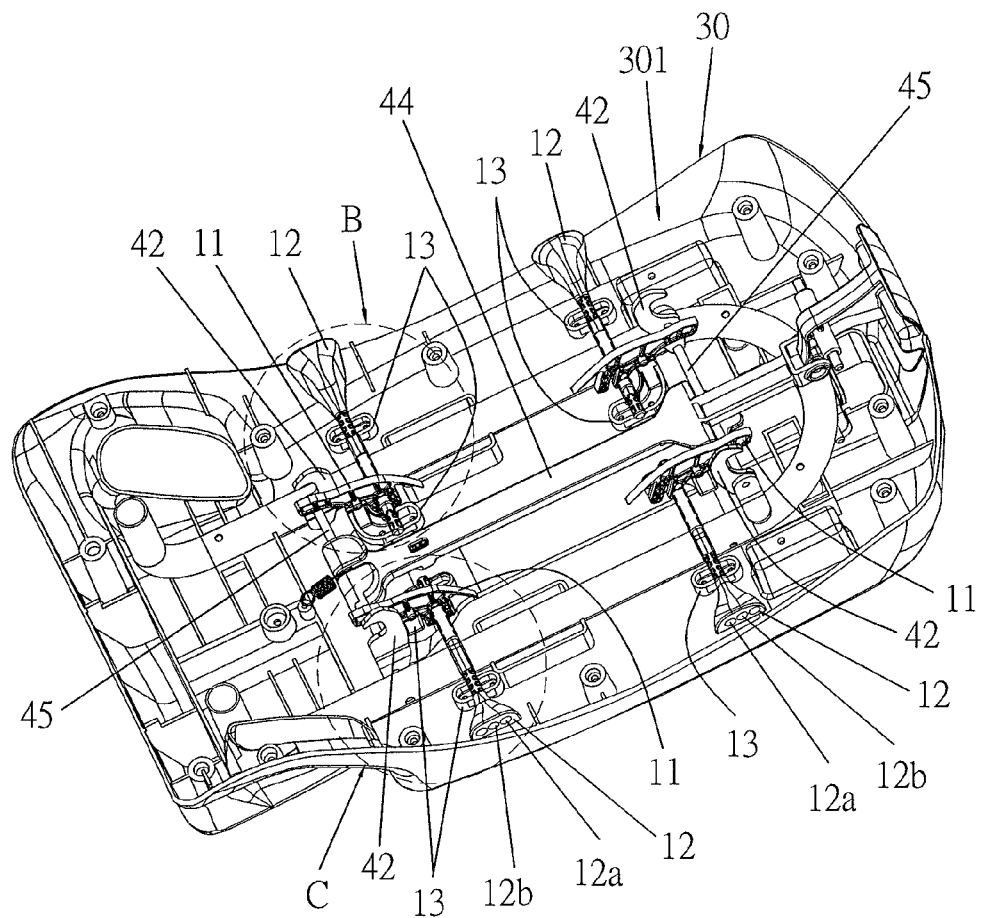
FIG. 6 is a cutaway perspective view of the base of the preferred embodiment.
Figure 7:
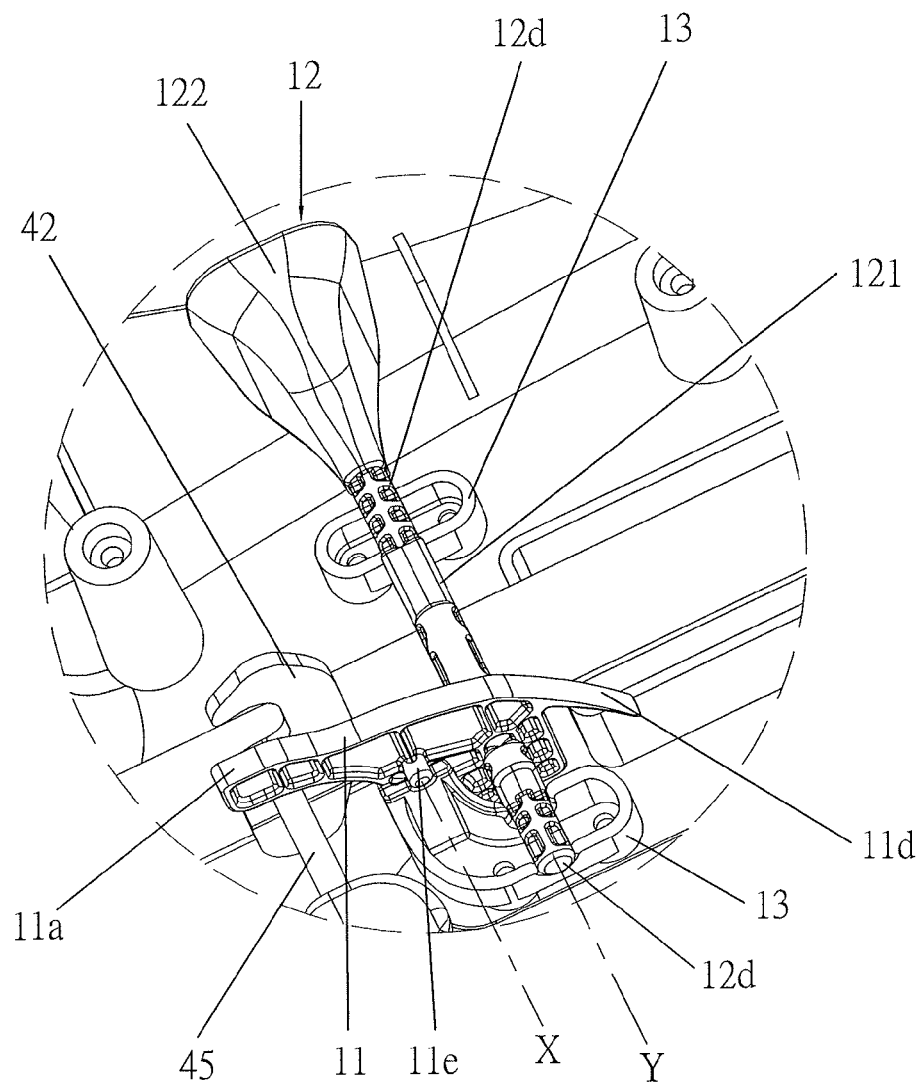
FIG. 7 is an enlarged perspective view of an area within a circle (B) of FIG. 6.
Figure 8:
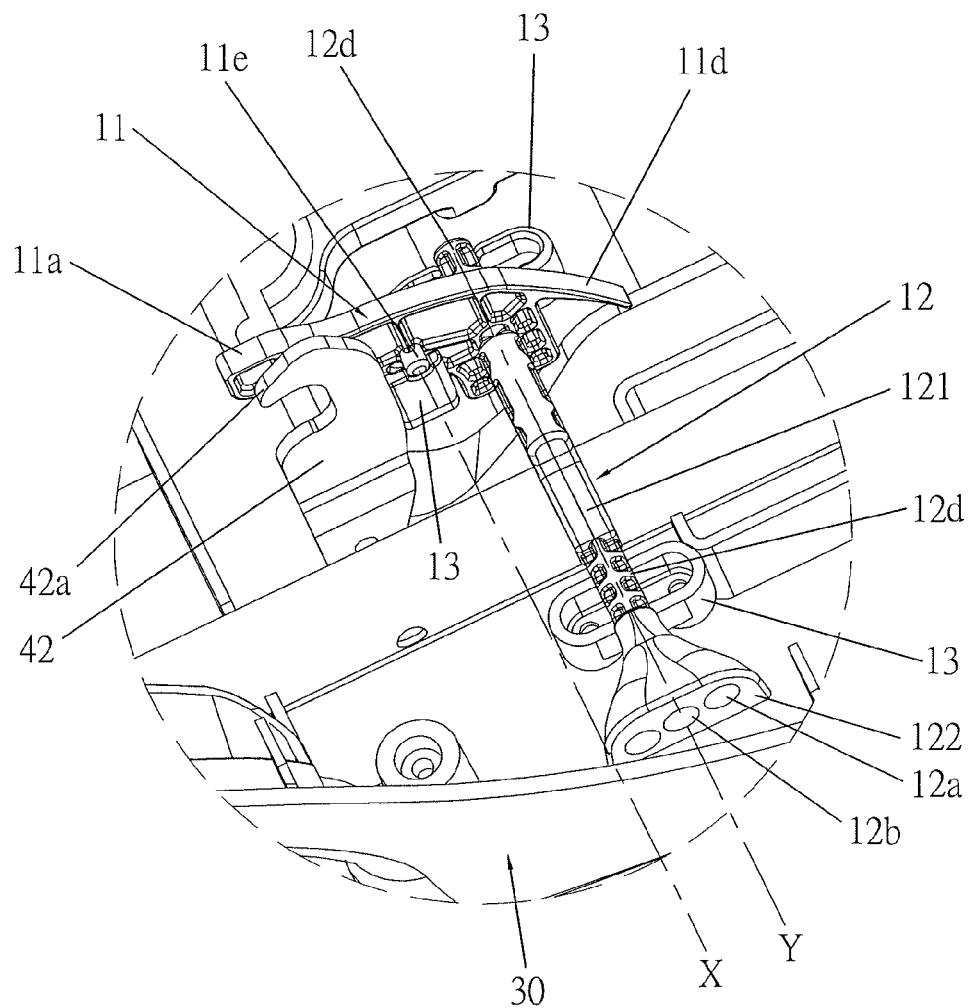
FIG. 8 is an enlarged perspective view of an area within a circle (C) of FIG. 6.
Figure 9:
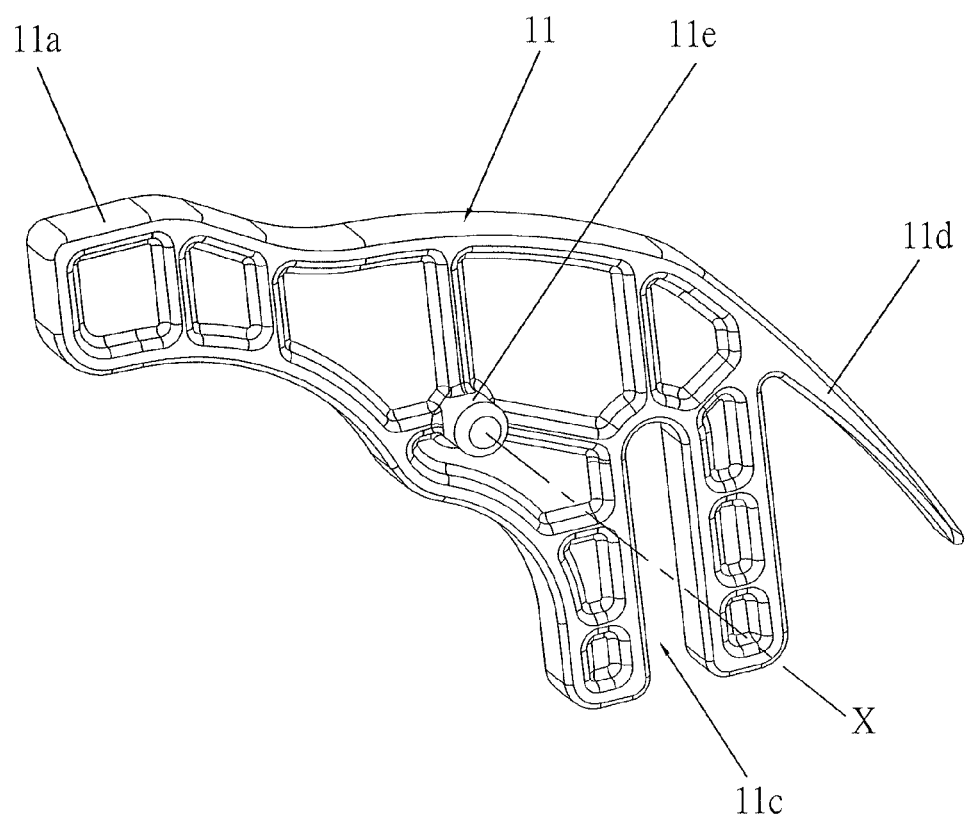
FIG. 9 is a perspective view of a lever member of the preferred embodiment.
Figure 10:
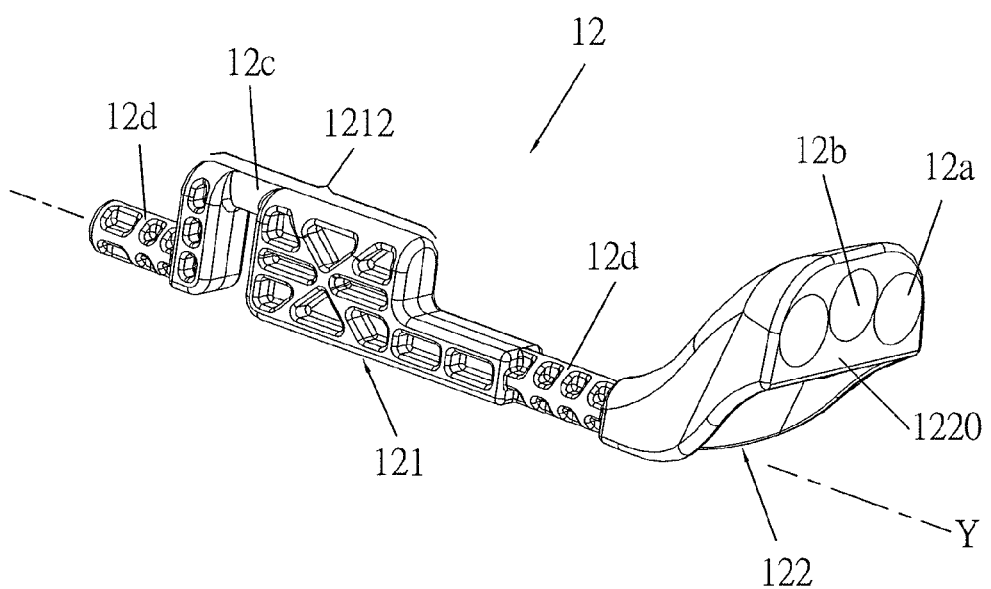
FIG. 10 is a perspective view of an indicator of the preferred embodiment.

FIGS. 1 to 10 illustrate the preferred embodiment of a child car safety seat according to the present invention. The child car safety seat includes a base 3 having a plurality of pivot posts 13 (see FIG. 6) and a shell body 30 that defines an inner space 301 therein and that is formed with four viewing windows 31 for permitting a user to view therethrough into the inner space 301, the pivot posts protruding from the shell body 30 into the inner space 301, two of the viewing windows 31 being disposed at one side of the shell body 30 and being spaced apart from each other, while the other two of the viewing windows 31 being disposed at another side of the shell body 30 and being spaced apart from each other; a seat body 2 detachably mountable on and engageable with the base 3; four indicators 12 (see FIG. 6), each of which is disposed in the inner space 301 in the shell body 30 and each of which has first and second indications 12a, 12b; and four lever members 11 (see FIG. 6), each of which is operatively associated with the base 3 and the seat body 2. The indicators 12 are disposed adjacent to the viewing windows 31, respectively. The four lever members 11 are connected to the indicators 12, respectively. Alternatively, the number of the indicators 12 and the number of the lever members 11 can be varied according to the actual requirements.

Figure 11:
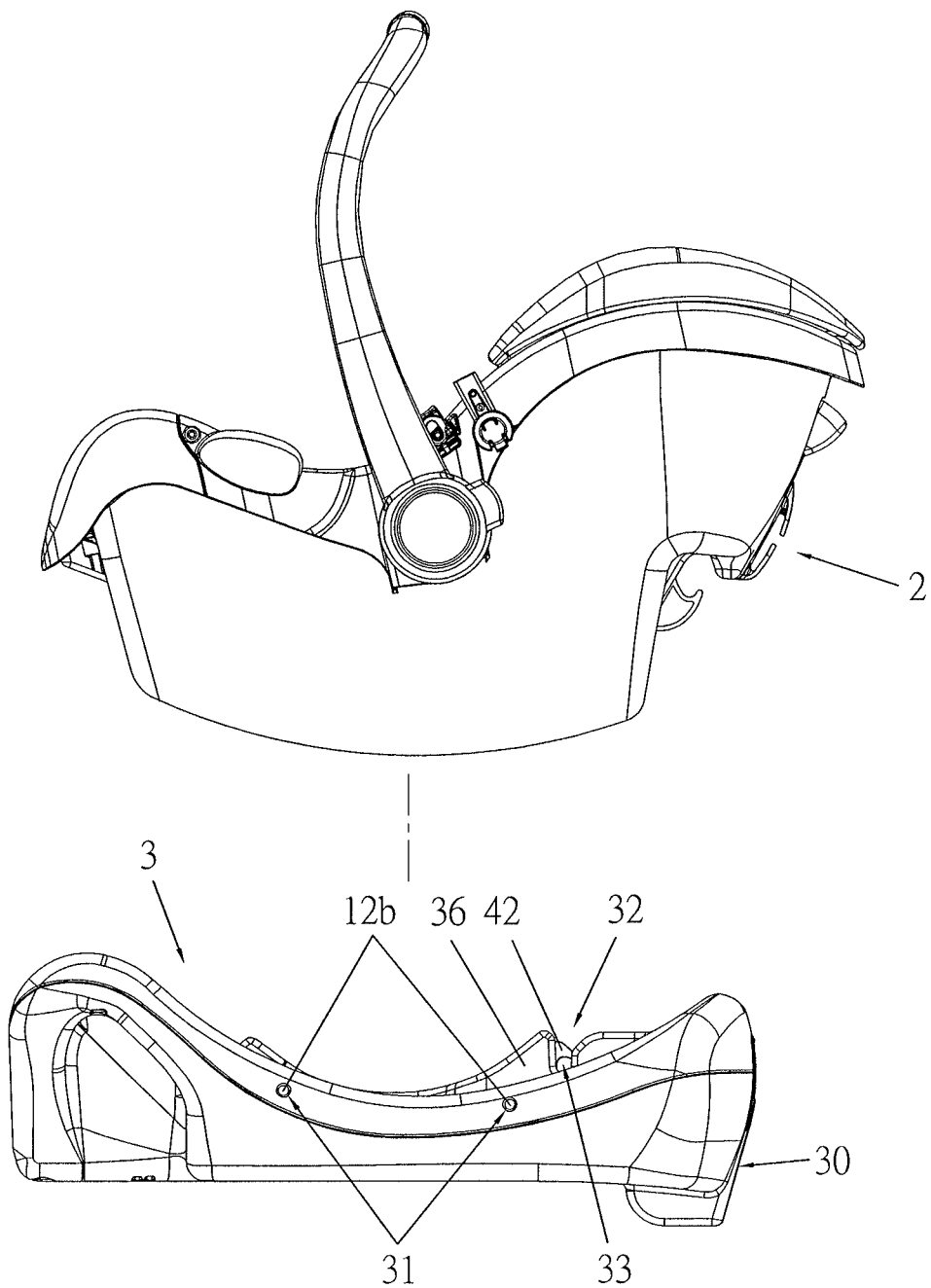
FIG. 11 is an exploded view to illustrate a non-engaging state between the base and the seat body of the preferred embodiment, where the indicator is disposed at a first angular position.
Figure 12:
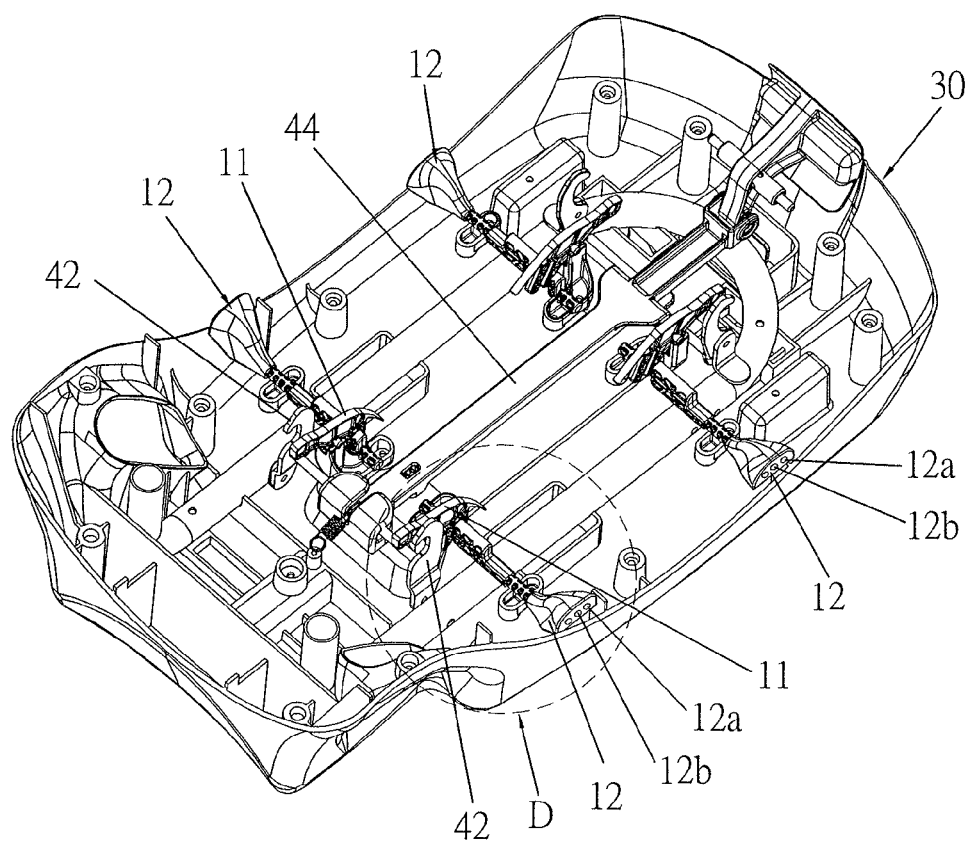
FIG. 12 is a cutaway perspective view to illustrate the non-engaging state of FIG. 11.
Figure 13:
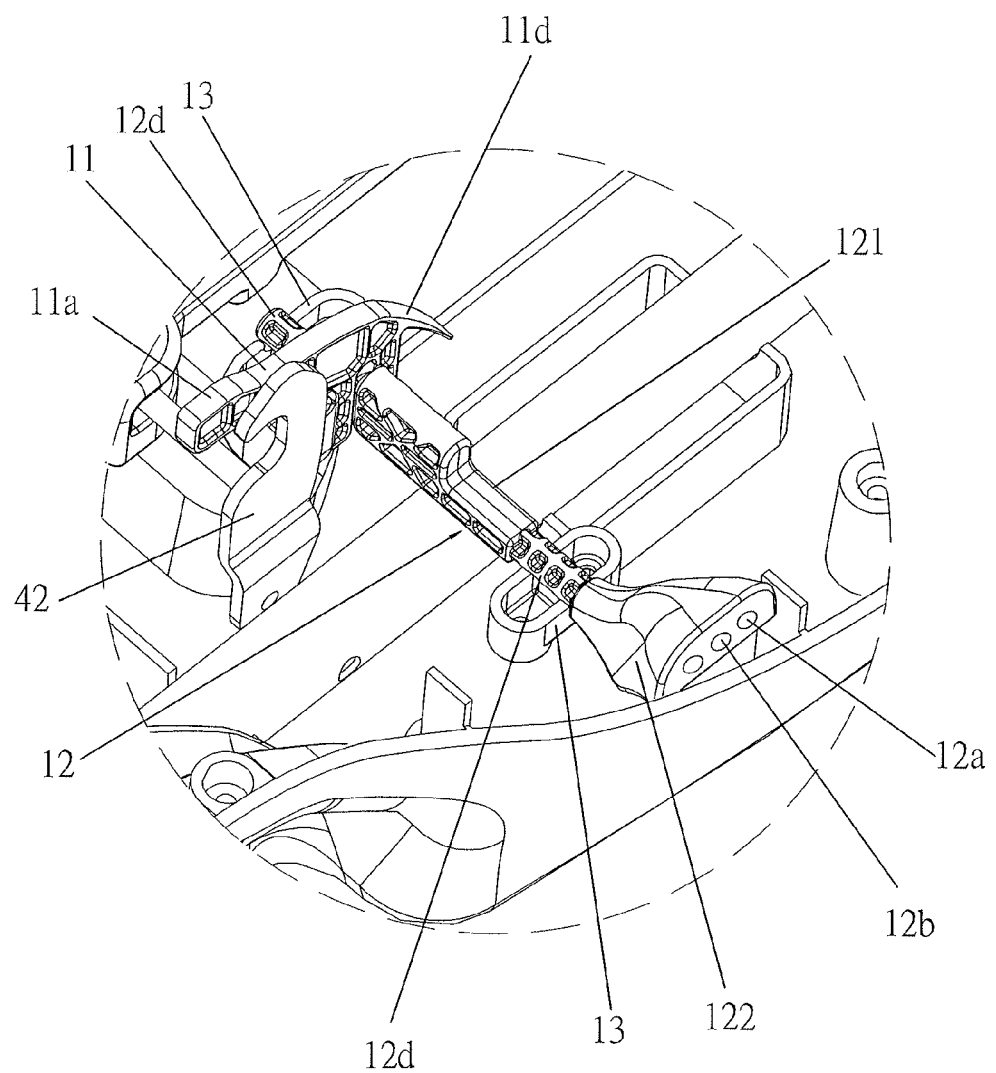
FIG. 13 is an enlarged view of an area within a circle (D) of FIG. 12.
Figure 14:
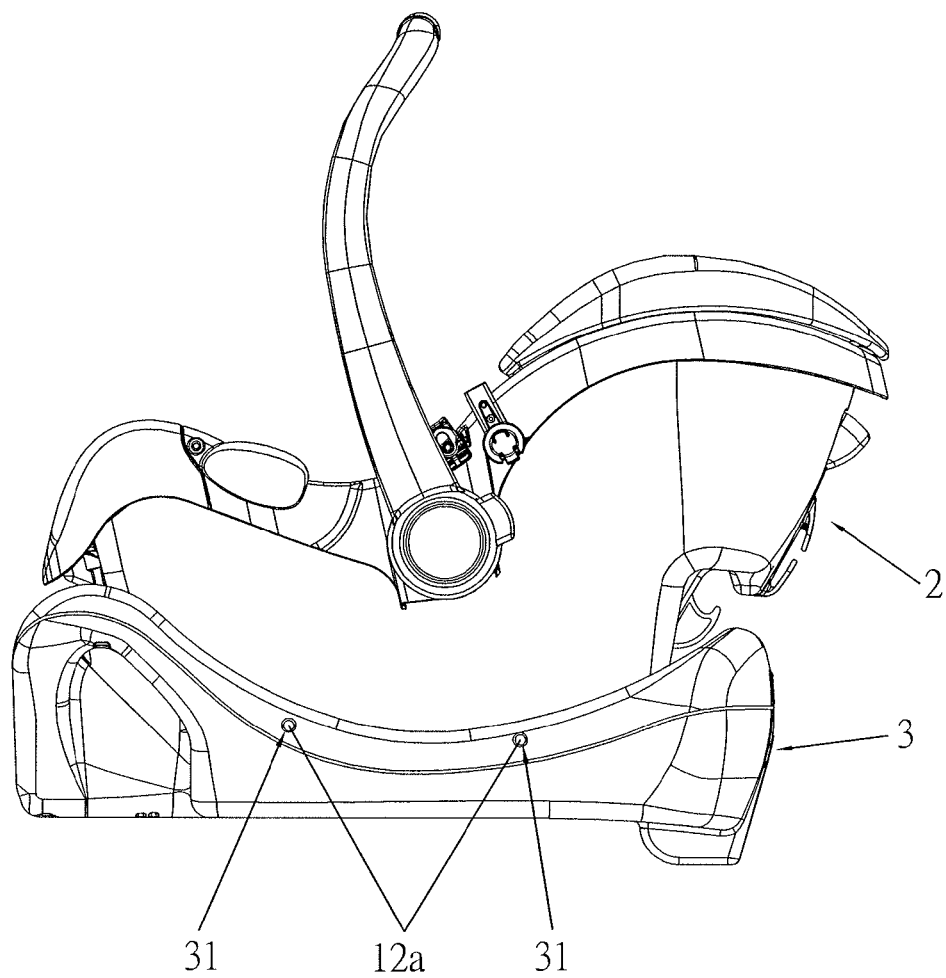
FIG. 14 is a side view to illustrate an engaging state between the base and the seat body of the preferred embodiment, where the indicator is disposed at a second angular position.
Figure 15:
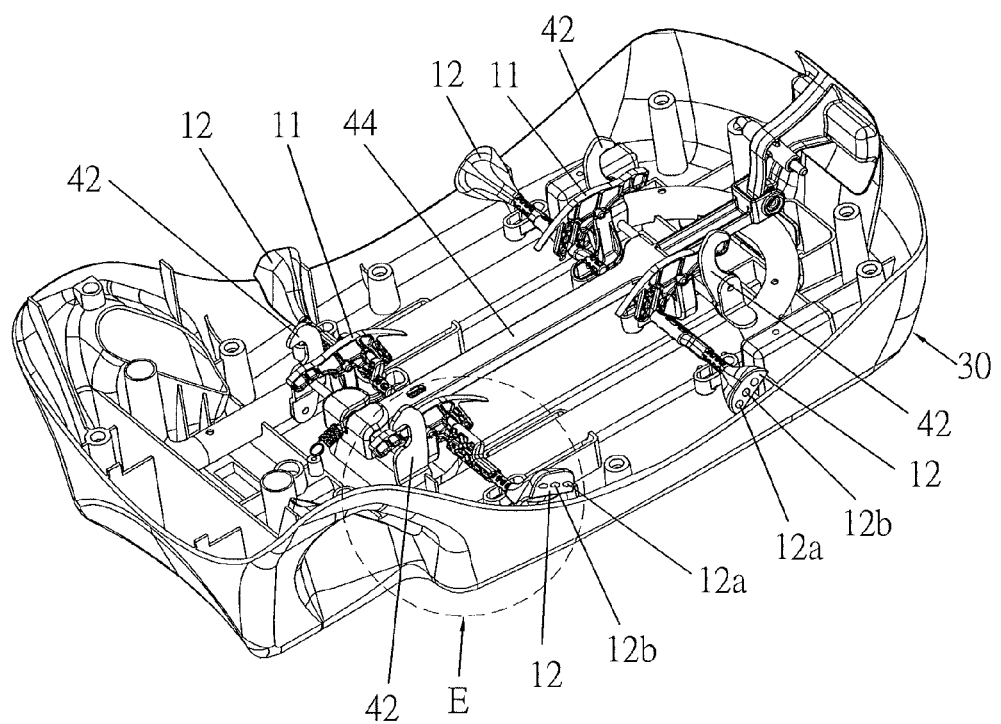
FIG. 15 is a cutaway perspective view to illustrate the engaging state of FIG. 14.
Figure 16:
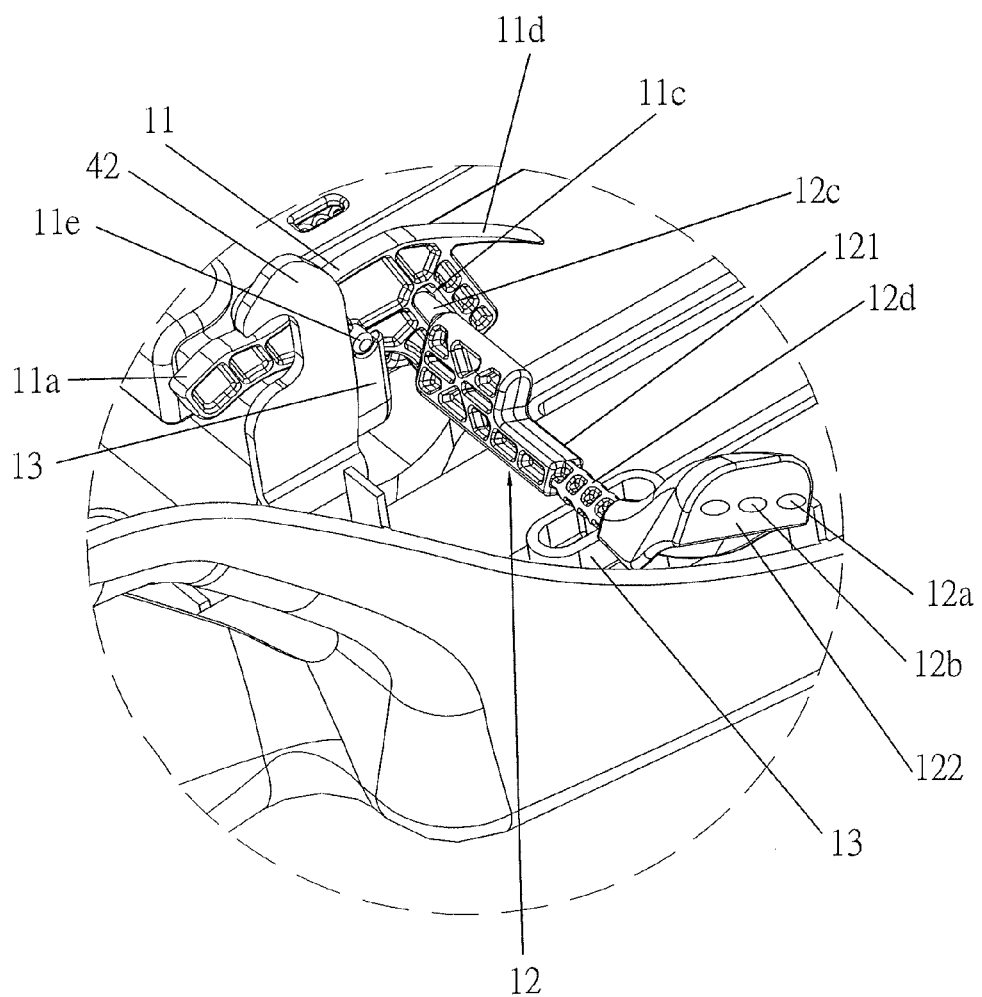
FIG. 16 is an enlarged view of an area within a circle (E) of FIG. 15.

Each of the indicators 12 is operatively associated with the base 3 and the seat body 2 such that each indicator 12 is movable between first and second angular positions (see FIGS. 15 and 12) upon engagement and disengagement between the base 3 and the seat body 2. To describe in more detail, each indicator 12 is disposed at the first angular position upon full engagement between the seat body 2 and the base 3 (see FIGS. 14 to 16), and is disposed at the second angular position upon disengagement between the seat body 2 and the base 3 (see FIGS. 11 to 13). When each indicator 12 is disposed at the first angular position, the first indication 12a thereof is disposed at a respective viewing window 31 (see FIG. 14) so as to permit the user to see the first indication 12a thereof through the respective viewing window 31, and the second indication 12b thereof is not disposed at the respective viewing window 31. When each indicator 12 is disposed at the second angular position, the first indication 12a thereof is not disposed at the respective viewing window 31 so that the first indication 12a cannot be seen by the user through the respective viewing window 31, and the second indication 12b thereof is disposed at the respective viewing window 31 (see FIG. 11) so as to permit the user to see the second indication 12b thereof through the respective viewing window 31.

The first and second indications 12a, 12b of each indicator 12 have different appearances, such as different colors. Preferably, the first indication 12a of each indicator 12 is in the form of a label with a green color, while the second indication 12b of each indicator 12 is in the form of a label with a red color.

Each of the lever members 11 has a resilient tail 11d and a pivot stud 11e (see FIG. 9) that is pivoted to a corresponding one of the pivot posts 13 of the base 3 so as to be rotatable relative to the base 3 about a first axis (X) (see FIGS. 7, 8 and 9) between angular positions. Each lever member 11 is formed with a notch 11c that is defined by a U-shaped notch-defining wall and that extends in a direction perpendicular to the first axis (X). The resilient tail 11d is resiliently deformable and abuts resiliently against the base 3 (not shown) for restoring the lever member 11 to its original angular position.

In this embodiment, each indicator 12 further has a spindle 121 (see FIG. 10) that is pivoted to corresponding ones of the pivot posts 13 of the base 3, and an enlarged block 122 that is enlarged from the spindle 121 and that has an end face 1220. The first and second indications 12a, 12b of each indicator 12 are disposed on the end face 1220 of the enlarged block 122, and are spaced apart from each other. The spindle 121 is rotatable relative to the base 3 about a second axis (Y) (see FIGS. 7, 8, and 10) that is parallel to the first axis (X), and has first and second shaft portions 12d and a U-shaped crank portion 1212 (see FIG. 10) extending between the first and second shaft portions 12d. The first and second shaft portions 12d are coaxially aligned with each other, and extend along the second axis (Y). The U-shaped crank portion 1212 has an axial section 12c that extends in a direction parallel to the second axis (Y) and that is received in the notch 11c in the respective one of the lever members 11 so that rotation of each lever member 11 about the first axis (X) drives rotation of the spindle 121 of the respective indicator 12 about the second axis (Y).

Figure 17:
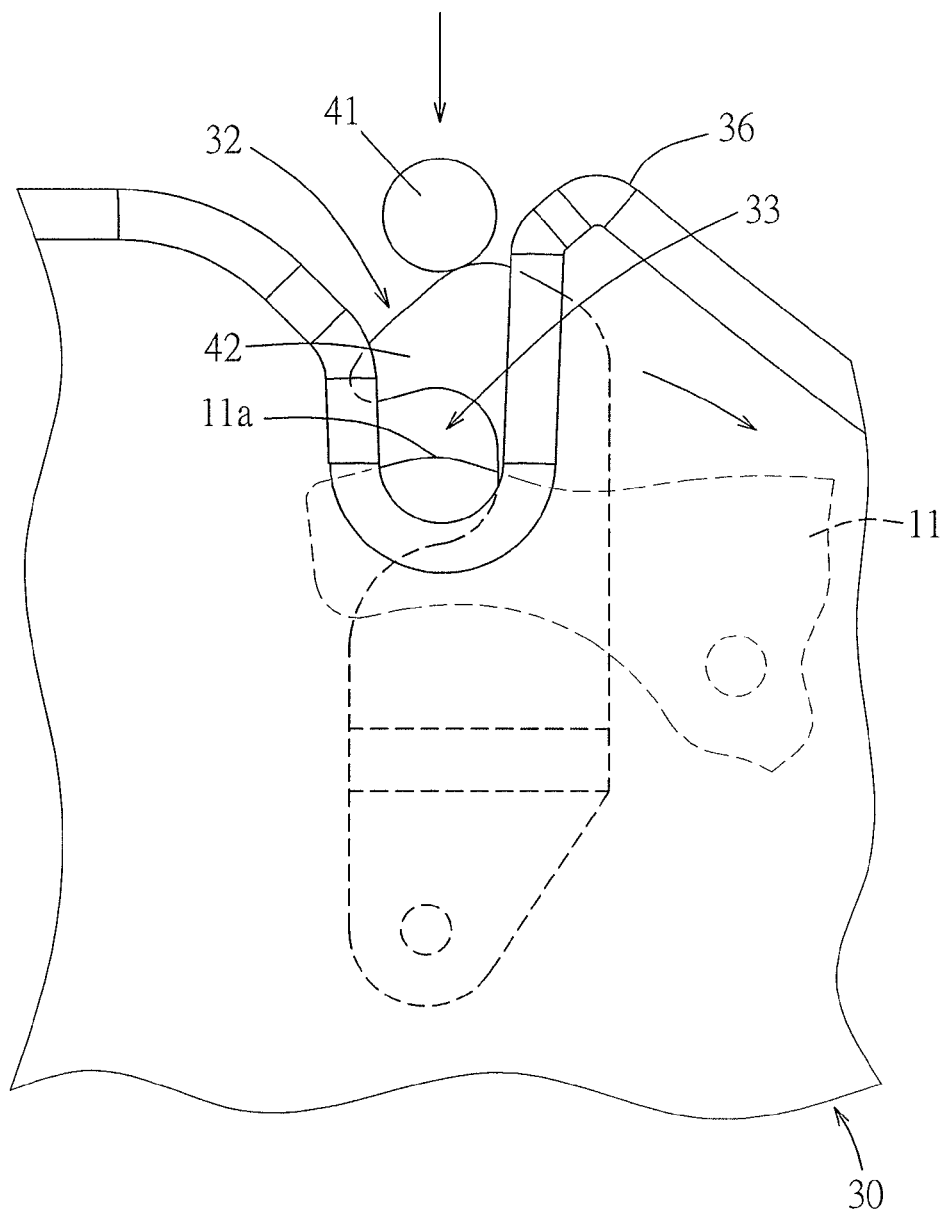
FIGS. 17 to 19 are schematic views to illustrate how a latch rod is brought into engagement with a hook member and a lever member upon engagement between the seat body and the base of the preferred embodiment.
Figure 18:
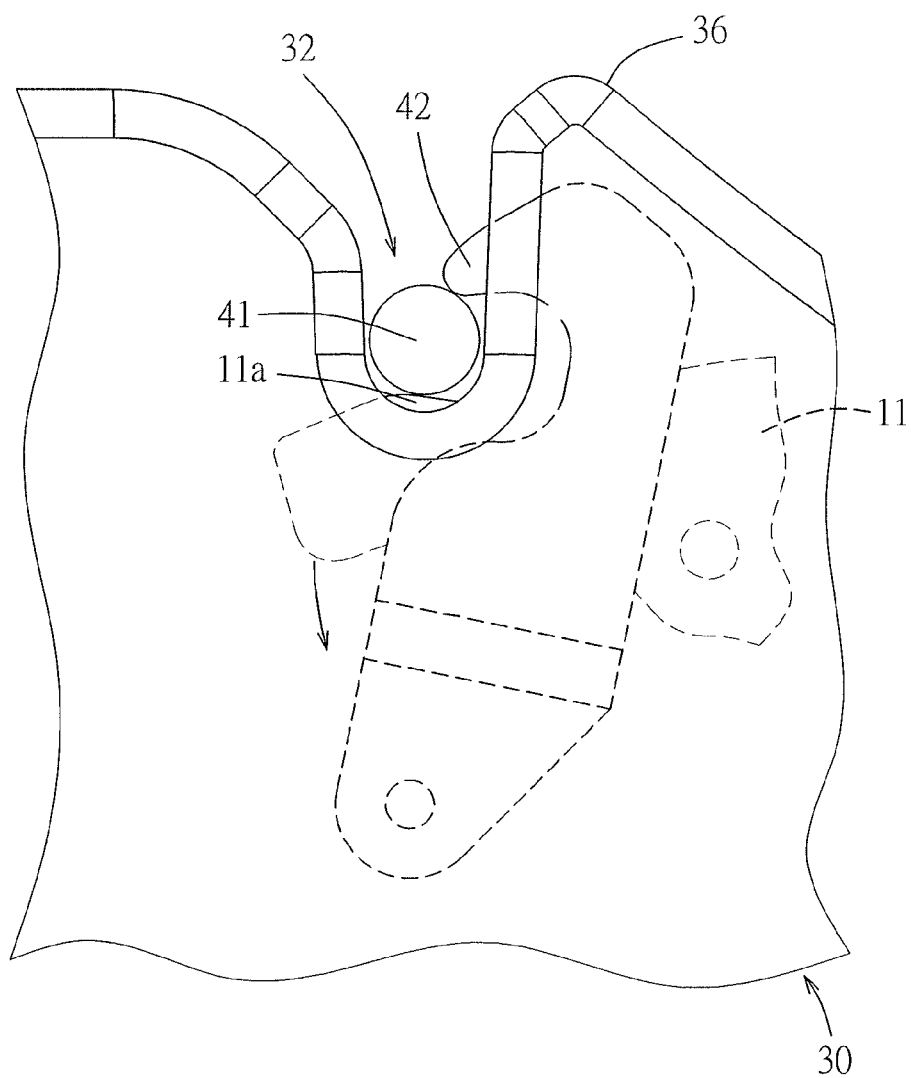
Figure 19:
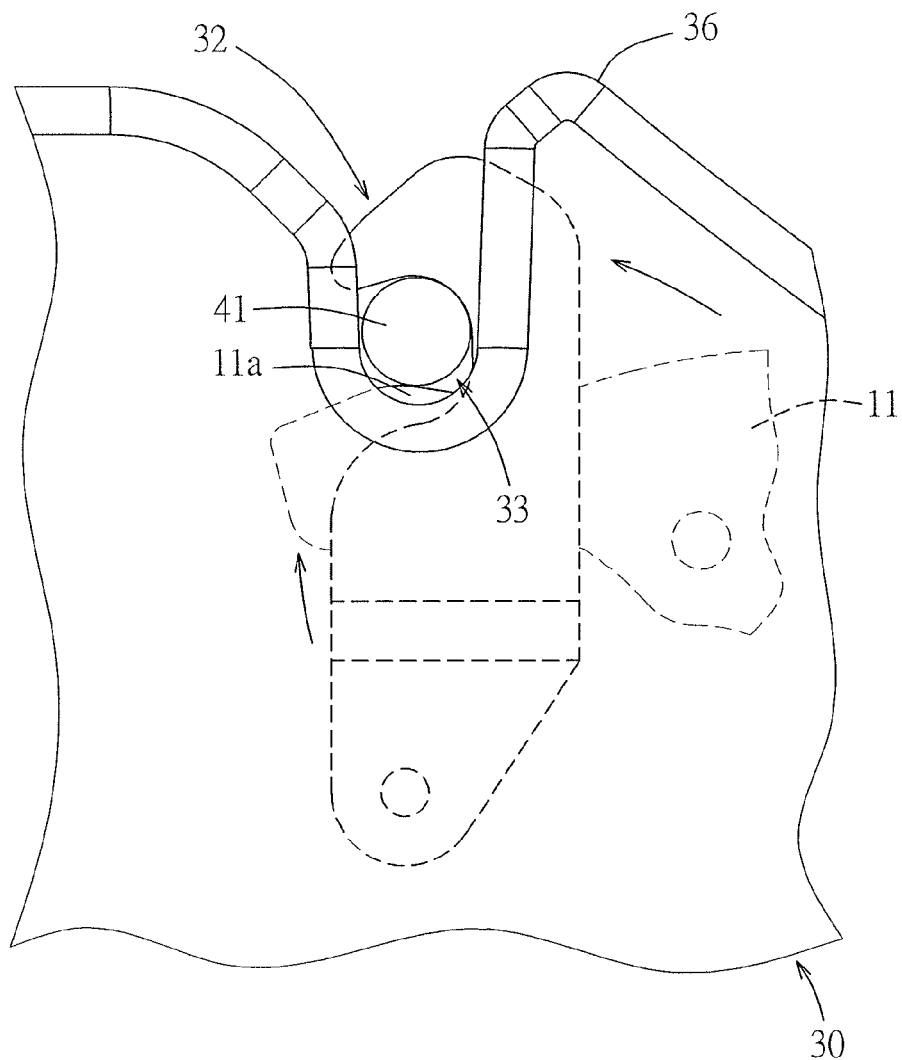

The shell body 30 has a topside 302 and two protruding ribs 36 (see FIGS. 3 and 4) that protrude upwardly from the top side 302, and is formed with four retaining recesses 32 in the ribs 36. Each lever member 11 is disposed in the inner space 301, and has a driven end 11a that extends into a respective one of the retaining recesses 32 (see FIG. 5). The base 3 further has two interconnecting rods 45 (see FIG. 6), four urging members (not shown) and four hook members 42 urged by the urging members, respectively. Each of the hook members 42 is disposed in the inner space 301, is pivoted to the shell body 30 at a bottom end of the hook member 42 (see FIG. 8) through a pivot pin (not shown), and is extendable into a respective one of the retaining recesses (see FIG. 5) by an urging force of the respective urging member. Each of the interconnecting rods 45 interconnects two corresponding ones of the hook members 42 so as to be co-rotatable therewith relative to the base 3. Each hook member 42 cooperates with a recess-defining wall 320 of the respective retaining recess 32 to define a closed-loop retaining space 33 (see FIG. 5) therebetween. The seat body 2 has a bottom side 21 and two latch rods 41 (see FIG. 2) that are mounted to the bottom side 21. Referring now to FIGS. 17 to 19, each of the latch rods 41 is slidable into the closed-loop retaining spaces 33 respectively associated with two corresponding ones of the retaining recesses 32 (only one retaining recess 32 is shown in FIGS. 17 to 19) for engaging the corresponding ones of the hook members 42 and pushing the driven ends 11a of two corresponding ones of the lever members 11 to rotate the lever members 11 about the first axis (X). In this embodiment, each latch rod 41 is clamped between the corresponding hook members 42 and the corresponding lever members 11 when the seat body 2 engages the base 3 through the latch rods 41 and the hook members 42.

An unlocking lever 44 (see FIGS. 6 and 15) is mounted in the base 3 for rotating the hook members 42 to move into the inner space 301 against the urging force of the urging members, thereby permitting removal of the latch rods 41 out of the retaining recesses 32.

With the inclusion of the indicators 12 in the child car safety seat of the present invention, the aforesaid drawback associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A child car safety seat comprising:
   a base having a shell body that defines an inner space therein and that is formed with a viewing window for permitting a user to view therethrough into said inner space;
   a seat body detachably mountable on and engageable with said base;
   a lever member pivoted to said base so as to be rotatable relative to said base about a first axis; and
   an indicator disposed in said inner space in said shell body and having a spindle that is pivoted to said base and that is rotatable relative to said base about a second axis parallel to the first axis, rotation of said lever member about the first axis driving rotation of said spindle about the second axis, said indicator further having a first indication, said indicator being operatively associated with said base and said seat body such that said first indication is disposed at said viewing window upon engagement between said seat body and said base so as to permit the user to see said first indication through said viewing window and is not disposed at said viewing window upon disengagement between said seat body and said base so that said first indication cannot be seen by the user through said viewing window.

2. The child car safety seat of claim 1, wherein said indicator further has a second indication that is disposed at said viewing window upon disengagement between said seat body and said base so as to permit the user to see said second indication through said viewing window, and that is not disposed at said viewing window upon engagement between said seat body and said base, said first and second indications having different appearances.

3. The child car safety seat of claim 2, wherein said indicator further has an enlarged block that is enlarged from said spindle and that has an end face, said first and second indications being disposed on said end face of said enlarged block and being spaced apart from each other.

4. The child car safety seat of claim 3, wherein said lever member is formed with a notch extending in a direction perpendicular to said first axis, and said spindle having first and second shaft portions and a U-shaped crank portion extending between said first and second shaft portions, said first and second shaft portions being coaxially aligned with each other and extending along said second axis, said U-shaped crank portion having an axial section that extends in a direction parallel to said second axis and that is received in said notch so that rotation of said lever member about said first axis drives rotation of said spindle about said second axis.

5. The child car safety seat of claim 4, wherein said lever member has a resilient tail that is resiliently deformable for restoring said lever member to its original angular position.

6. The child car safety seat of claim 4, wherein said shell body has a top side and a rib protruding from said top side, and is formed with a retaining recess in said rib, said lever member being disposed in said inner space and having a driven end that extends into said retaining recess, said base further having a hook member that is disposed in said inner space, that is pivoted to said shell body, and that is extendable into said retaining recess, said seat body having a bottom side and a latch rod that is mounted to said bottom side and that is slidable into said retaining recess for engaging said hook member and pushing said driven end of said lever member to rotate said lever member about said first axis.

7. The child car safety seat of claim 6, wherein said latch rod is clamped between said hook member and said lever member.

8. A child car safety seat comprising:
a base having a shell body that defines an inner space therein and that is formed with a viewing window for permitting a user to view therethrough into said inner space;
a seat body detachably mountable on and engageable with said base, said seat body including a latch rod;
a lever member pivotally coupled to said base so as to be rotatable relative to said base about a first axis, said lever being rotated about said first axis by engagement and disengagement of said lever with said latch rod; and
an indicator disposed in said inner space in said shell body and having a spindle that is pivotally coupled to said base, rotation of said lever member about said first axis driving rotation of said spindle about a second axis, said indicator being operatively associated with said base and said seat body such that, upon said lever being operably engaged by said latch rod, a first indication of said indicator is rotatably displaced with said spindle to permit the user to see said first indication through said viewing window, and, upon disengagement between said latch rod and said lever, said first indication being rotatably displaced with said spindle such that said first indicator is not disposed at said viewing window.

9. The child car safety seat of claim 8, wherein said indicator further has a second indication that is disposed at said viewing window upon disengagement between said latch rod and said lever so as to permit the user to see said second indication through said viewing window, and is not disposed at said viewing window upon engagement between said latch rod and said lever, said first and second indications having different appearances.

10. The child car safety seat of claim 9, wherein an end of said spindle includes an enlarged block having an end face, said first and second indications being disposed on said end face.

11. The child car safety seat of claim 10, wherein said lever member is formed with a notch extending in a direction perpendicular to said first axis, said second axis is parallel to said first axis, and said spindle includes first and second shaft portions and a U-shaped crank portion extending between said first and second shaft portions, said first and second shaft portions being coaxially aligned with each other and extending along said second axis, said U-shaped crank portion having an axial section that extends in a direction parallel to said second axis and that is received in said notch so that rotation of said lever member about said first axis drives rotation of said spindle about said second axis.

12. The child car safety seat of claim 11, wherein said lever member has a resilient tail that is resiliently deformable for restoring said lever member to its original angular position.

13. The child car safety seat of claim 11, wherein said shell body has a top side and a rib protruding from said top side, and is formed with a retaining recess in said rib, said lever member being disposed in said inner space and having a driven end that extends into said retaining recess, said base further having a hook member that is disposed in said inner space, that is pivoted to said shell body, and that is extendable into said retaining recess, said latch rod being mounted to a bottom side of said seat body, said latch rod being slidable into said retaining recess for engaging said hook member and pushing said driven end of said lever member to rotate said lever member about said first axis.

14. The child car safety seat of claim 13, wherein said latch rod is clamped between said hook member and said lever member.

15. A child car safety seat comprising:
a seat body;
a base having a shell body that defines an inner space therein and that is formed with a viewing window for permitting a user to view therethrough into said inner space;
a lever member that is pivoted to said base so as to be rotatable relative to said base about a first axis, said lever member having a notch that extends in a direction perpendicular to said first axis; and
an indicator disposed in said inner space in said shell body, and having a spindle that has an axial portion received in said notch so that rotation of said lever member about said first axis drives rotation of said spindle about a second axis, said second axis being parallel to said first axis, said indicator having a first indication, said indicator being operatively associated with said base and said seat body such that said first indication is disposed at said viewing window upon said seat body being secured to said base so as to permit the user to see said first indication through said viewing window and is not disposed at said viewing window upon said seat body being detachable from said base so that said first indication cannot be seen by the user through said viewing window.

16. The child car safety seat of claim 15, wherein said indicator further has a second indication that is disposed at said viewing window upon said seat body being detachable from said base so as to permit the user to see said second indication through said viewing window, and that is not disposed at said viewing window upon said seat body being secured to said base, said first and second indications having different appearances.

17. The child car safety seat of claim 16, wherein said spindle is pivoted to said base, said first and second indications being disposed on an end face of said spindle and being spaced apart from each other.

18. The child car safety seat of claim 17, wherein said spindle has a U-shaped crank portion that extends between a first shaft portion and a second shaft portion of said spindle, said first and second shaft portions being coaxially aligned with each other and extending along said second axis, said U-shaped crank portion including the axial section, the axial section extending in a direction parallel to said second axis and that is received in said notch so that rotation of said lever member about said first axis drives rotation of said spindle about said second axis.

19. The child car safety seat of claim 18, wherein said lever member has a resilient tail that is resiliently deformable for restoring said lever member to its original angular position.

20. The child car safety seat of claim 18, wherein said shell body has a top side and a rib protruding from said top side, and is formed with a retaining recess in said rib, said lever member being disposed in said inner space and having a driven end that extends into said retaining recess, said base further having a hook member that is disposed in said inner space, that is pivoted to said shell body, and that is extendable into said retaining recess, said seat body having a bottom side and a latch rod that is mounted to said bottom side and that is slidable into said retaining recess for engaging said hook member and pushing said driven end of said lever member to rotate said lever member about said first axis.

* * * * *